UNITED STATES PATENT OFFICE.

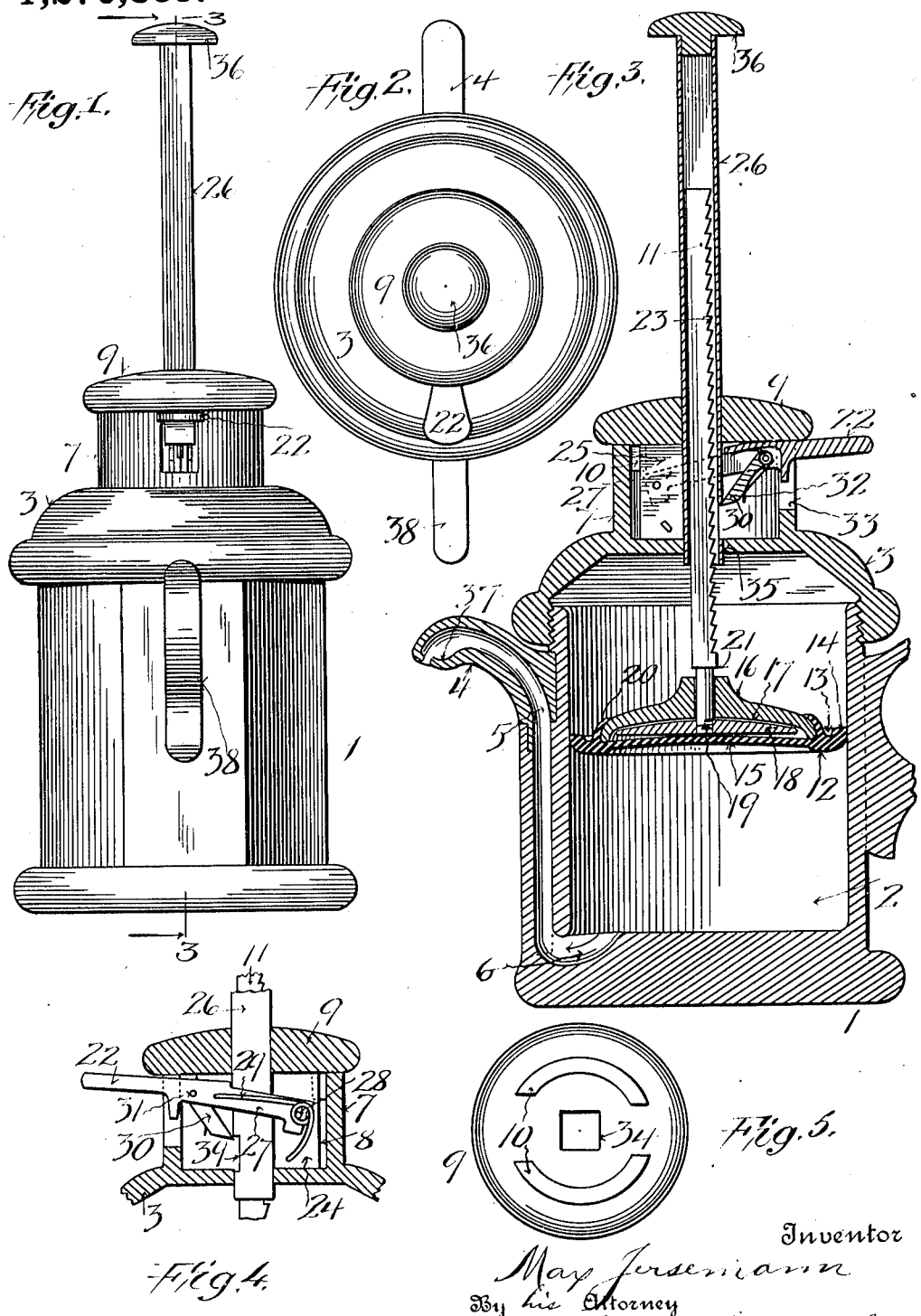

MAX JERSEMANN, OF BROOKLYN, NEW YORK.

FLUID OR SEMIFLUID DISPENSING DEVICE FOR TABLE USE.

1,270,835.                   Specification of Letters Patent.      Patented July 2, 1918.

Application filed July 23, 1915. Serial No. 41,435.

*To all whom it may concern:*

Be it known that I, MAX JERSEMANN, a citizen of the United States, and a resident of the borough of Brooklyn, in the city of New York, county of Kings, and State of New York, have invented certain new and useful Improvements in Fluid or Semifluid Dispensing Devices for Table Use, of which the following is a specification.

My invention relates to a novel device for dispensing fluid or semi-fluid substances and it is expecially advantageous for table use. The device may be used for dispensing catsup, mustard, syrup, condensed milk, dressings of all kinds, salad oils and various other fluids or semi-fluids used for food.

The objects of my invention are to provide a dispenser from which the contents may be very conveniently dispensed and which will avoid unintentional discharge of the contents. Another object of my invention is to avoid dripping at the discharge opening when the device ceases to be operated, so that the device will be clean and not soil the tablecloth or hands.

Other objects of the device are to protect the contents from exposure, keep it clean, prevent wastage of the contents and permit the discharge of just the exact quantity.

In the drawings forming part of this application,

Figure 1 is an elevation of my invention in the preferred form,

Fig. 2 is a plan view thereof,

Fig. 3 is a vertical sectional view, taken on the line 3—3 of Fig. 1,

Fig. 4 is an enlarged detail of the actuating lever, and

Fig. 5 is an inverted plan view of the cap.

The device consists, primarily, of a receptacle adapted to hold a supply of the material to be dispensed, and this receptacle may be variously shaped and it may be decorated or ornamented to be pleasing and attractive. The size may vary within wide limits according to the uses of the article or the particular materials to be dispensed.

The receptacle shown herein comprises a body 1 having an interior bore or chamber 2, which is shown herein as circular and of greater dimension in the vertical direction. This chamber is adapted to contain a supply of the material to be dispensed, whether a fluid or a semi-fluid. The chamber is closed at the top by means of a cover 3 which is screwed or otherwise attached to the receptacle.

There is preferably a spout 4 on the receptacle for conveniently pouring the contents, and the bore 5 of this spout opens at 6 into the chamber 2, so that the material may flow from the chamber through the spout and be dispensed wherever desired. It will be noted that the open end of the spout terminates considerably above the bottom of the receptacle, and preferably near the highest level of the liquid therein, so that the contents will not flow out except when the operating parts are actuated.

The cover 3 has an upwardly extending wall 7 which forms a compartment 8 to receive and inclose the working parts, and this compartment is closed by a removable cap 9 having in interrupted downwardly extending flange 10 which fits inside the wall, 7. There is a spindle 11 which is slidable through the cap 9 and cover 3 and it extends down into the chamber 2 where it serves to operate a piston or plunger that forces the material out of the receptacle.

Operating in close contact with the interior of the receptacle there is a washer 12 of flexible material, such as rubber, and the downward movement of this washer or piston is adapted to force down the contents in the chamber and thus compel it to rise in the spout and discharge at the open end thereof. The washer or piston 12 has an annular groove 13 which makes it possible for the outer edge 14 to bend more or less without moving out of contact with the receptacle. Preferably, this washer or piston normally bends upwardly at its central portion 15 so that this portion may be more or less flexed without drawing the edge 14 away from the receptacle. There is a carrier 16 for the washer, which is here shown as of circular shape and having its under surface recessed or concaved at 17 to provide a space for the reception of the head 18. The latter lies between the carrier 16 and the washer 12 and it is fixed to the spindle, preferably by the screw threads 19. The washer is herein shown attached to the carrier by means of an annular lip 20 which engages over the edge of the carrier. The washer, therefore, will travel up and down with the carrier.

The shoulder 21 on the spindle is so positioned that the spindle may be slightly lowered before the shoulder meets the carrier, the purpose of which will be made apparent hereinafter.

The spindle, and, therefore, the piston, is adapted to be moved downward gradually and preferably by a measured step by step motion. For this purpose I prefer to arrange a lever 22 to act on the rack teeth 23 on the spindle. In the chamber 8 formed by the wall 7 of the cover I have arranged the parallel plates 24, 25 which are removable from the chamber 8. These plates are preferably, though not necessarily, attached to or integral with the tube 26 which incloses the upper part of the spindle.

The finger lever 22 has forked ends 27, which straddle the tube, and the plates, 24, 25 and their ends are connected by a pin 28 to these plates and on this pin the finger lever may rock.

The finger lever is raised by means of a spring 29 which has one end connected to the plate 27 and the other to the lever, so that after the lever is depressed it is again raised to the position shown in the drawings by its spring. The lever carries a pawl 30 which is fulcrumed thereto by the pin 31 and a spring 32 coiled around the pin 31 has one end pressing on the lever and the other on the pawl.

The lever, 22, projects beyond the wall 7 sufficient to permit it to be engaged by the operator's finger and it is adapted to move vertically in the slot 33.

The tube 26 may be of any desired shape and it may be formed integral with any of the parts of the receptacle if desired. Its purpose is to inclose the spindle above the receptacle and prevent the piston from being forced down otherwise than by the action of the finger lever. The tube 26 is here shown as snugly fitting an aperture 34 in the cap 9 and a similar aperture 35 in the cover 3. It may be removed with and from the cap 9. The top of the tube 26 is preferably closed by a removable cap 36 to permit the tube to be easily cleaned.

It is to be noted that the spout 4 has a recess 37 just inside the discharge opening, which will receive and hold a drop of the fluid if such should remain at the opening when the pouring has ceased.

*Operation.*

The cover and the parts associated therewith, are removed from the receptacle and the material to be dispensed is placed in the receptacle to any desired height. The cover is then screwed onto the receptacle.

The washer 12 fits snugly against the interior surface of the receptacle and it may require pressure to bring it to the level of the liquid.

The receptacle may be grasped by the handle 38 and with a finger of the same hand the lever 22 is depressed. The pawl 30 will be forced by its spring into engagement with one of the teeth 23 of the spindle and as the lever continues to move downwardly it will force down the spindle and the piston. As the latter moves downwardly the material in the receptacle will be forced out through the spout. The lever 22 may be depressed very gradually, in which event the material will pour gradually from the spout. This is very desirable in many instances as it permits the material to be spread while being poured. But should the finger lever be depressed suddenly there will be no disagreeable result because the spout will direct its discharge downward. When the pawl reaches the lower edge of the opening 39 in the tube 26 the lever can no longer be depressed. In order to dispense more of the material it is necessary to allow the lever to return again to its upper position, after which it is again depressed. On this second downward movement, the pawl 30 will engage in a new position on the rack, so that the piston will be moved downwardly to a greater extent. Each time the lever 22 returns to its uppermost position the pawl 30 escapes the teeth of the rack, so that the piston remains in the new position to which it has been forced. When the pawl is in its higher position, as shown in Fig. 3, it is held disengaged from the rack teeth by the tube 26, so that the spindle is free to move independently of the pawl.

When the spindle begins to move downwardly only the member 18 moves with it, and this flexes the arched portion 15 of the washer. After this occurs the shoulder 21 meets the member 16 and then all four members 11, 16, 18 and 12 move together and as long as the finger lever is moved. When the finger lever is allowed to return, the downward pressure on the piston ceases, whereupon the washer 12 by reason of its resilient nature bends upwardly at the middle 15 and raises the spindle slightly. This flexing action creates enough suction or drawback action on the material in the receptacle to withdraw any material remaining in the spout, so that there will be no dripping. The recess 37 will hold any of the material which is not actually drawn back over the top bend of the spout.

The piston is moved down by successive steps until the material has all been dispensed. At each operation of the lever 22 to the full extent there will be a given quantity of material dispensed and if desired the parts may be so proportioned that this will be just a spoonful.

The spindle may be long enough to force the piston to the bottom of the receptacle and still the latter need not extend to the highest point reached by the spindle. The device is conveniently operated with one hand. As the spindle is inclosed it cannot be accidentally depressed from above and accidental discharge of the material is thus avoided.

The device may be readily disassembled and all parts may be readily cleaned.

Except where otherwise specified the term piston is herein used in its broad sense to include any member adapted to act by compression to force the fluid or semi-fluid.

Having described my invention, what I claim is:

1. A device of the class described comprising a tubular receptacle and a piston for displacing material therein, comprising a washer extending across the bore of said receptacle and engaging around its periphery with the inner surface of the receptacle, said washer having a normally arched central portion and being formed of flexible material, and means for operating said piston, comprising means adapted to first depress said normally arched portion and then the outer portion of the piston, for the purpose set forth.

2. A device of the class described comprising a tubular receptacle and a piston for displacing material therein, comprising a flexible washer extending across the bore of said receptacle and engaging around its periphery with the inner surface of the receptacle, said washer having an annular groove around its outer portion, and having a normally arched central portion and means for operating said piston, comprising means adapted to first depress said normally arched portion and then the outer portion of the piston, for the purpose set forth.

3. A device of the class described, comprising a receptacle, and a piston for displacing material therein, and comprising a flexible member having a normally arched central portion, a spindle having a member acting on the arched portion of the spindle and a member having a limited movement in relation to the spindle for acting on the outer portion of the piston to advance it, and a lip on the piston, engaging over the edge of said member which engages the outer portion of the piston, whereby said member and the piston will move together.

Signed at the city, county and State of New York, this 22nd day of July, 1915.

MAX JERSEMANN.